Figure 1:
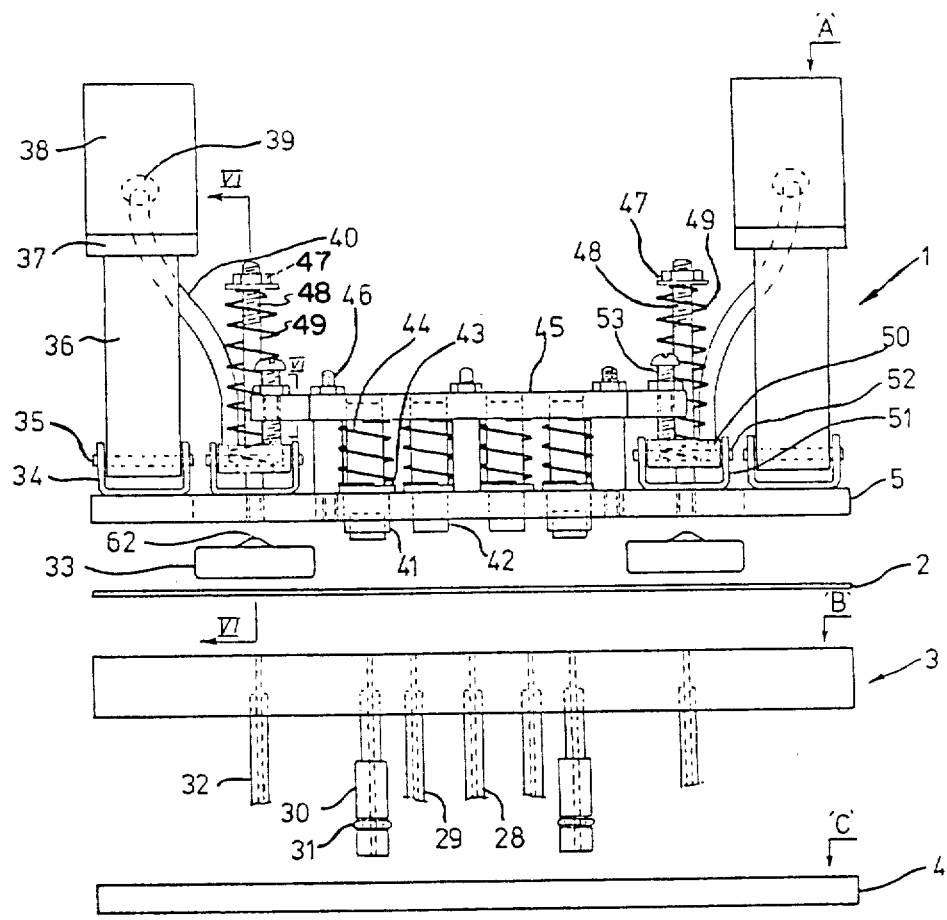

United States Patent [19]

Bensemann

[11] 4,245,579
[45] Jan. 20, 1981

[54] PRESSURIZED FLUID CIRCUITS

[75] Inventor: Erle W. Bensemann, Christchurch, New Zealand

[73] Assignee: Benefis Systems Limited, Christchurch, New Zealand

[21] Appl. No.: 895,218

[22] Filed: Apr. 10, 1978

[51] Int. Cl.² .................. G01L 19/12; G01L 19/10
[52] U.S. Cl. ............................. 116/70; 116/271
[58] Field of Search ............. 340/229, 240; 116/70, 116/106, 114 PV, 101; 235/201 ME; 138/40; 137/863; 251/61.1

[56] References Cited

U.S. PATENT DOCUMENTS

| 479,709 | 7/1892 | Goldstein | 116/106 |
| 3,027,746 | 4/1962 | Kappel | 138/40 |
| 3,209,721 | 10/1965 | Pall | 116/114 PV |
| 3,991,788 | 11/1976 | Kull | 137/863 |
| 3,999,437 | 12/1976 | Lepine | 116/114 PV |

*Primary Examiner*—Gerald Goldberg
*Assistant Examiner*—Denis E. Corr
*Attorney, Agent, or Firm*—Ladas, Parry, Von Gehr, Goldsmith & Deschamps

[57] ABSTRACT

Pressurized fluid circuits are provided which are suitable for use in a pressure drop detector for a pressurized fluid fire alarm system. The pressurized fluid circuits are provided as channels in the surface of a block of material and include one channel connected to a source of fluid pressure. The channels are associated with valve regions by means of which, with a diaphragm pressed thereagainst, a required one or more of the channels can be closed off.

In its application to a pressure drop detector a normally pressurized region of the diaphragm may support a mechanical linkage of the detector such that if the pressure drops, on release of pressure in the system, the collapsing of the diaphragm allows the mechanical linkage to be released thus actuating a fire alarm.

8 Claims, 10 Drawing Figures

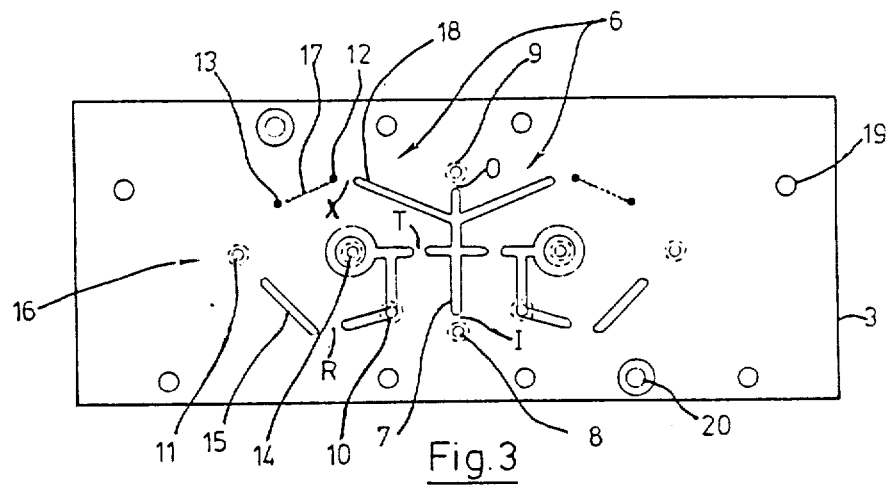
Fig. 3
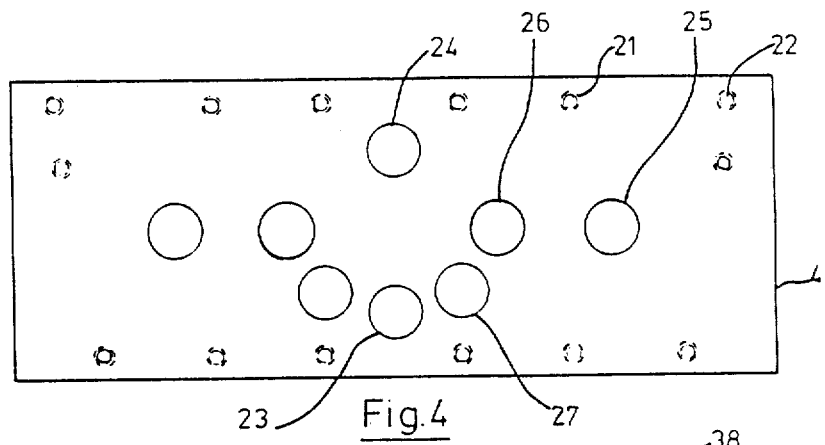
Fig. 4
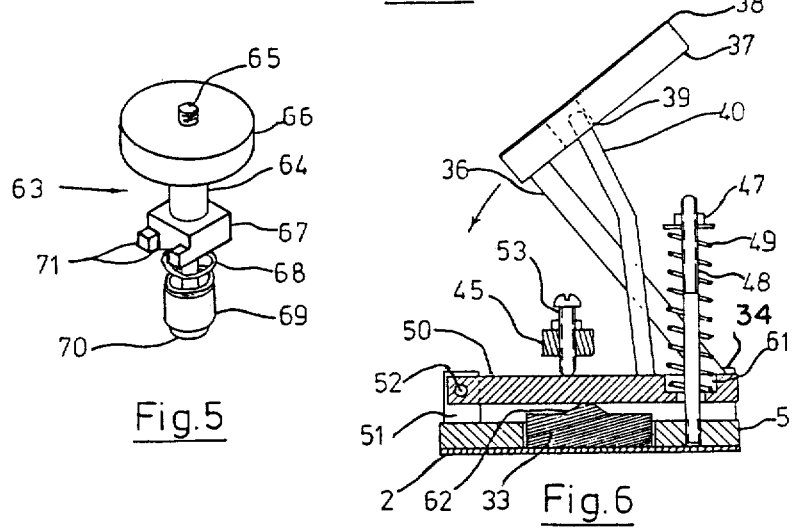
Fig. 5
Fig. 6

U.S. Patent    Jan. 20, 1981    Sheet 3 of 3    4,245,579

PRESSURIZED FLUID CIRCUITS

This invention relates to pressurized fluid circuits and pressure drop detectors suitable for use in pressurized fluid fire alarm systems.

Pressurized fluid fire alarm systems are those in which a pressurized fluid, normally compressed air, is contained within tubing connected between a number of temperature detectors located as and where required about an area to be protected. Each temperature detector includes a plug or seal of a fusible material which prevents the pressurized fluid from escaping from the detectors. Any such escape of pressurized fluid causes a drop in system pressure which is detected by pressure monitoring equipment and an alarm given. In the event of a fire the temperature rise would cause the melting of the fusible plug or seal in one or more of the detectors thus causing the loss of system pressure and a fire alarm being given.

In previous pressurized fluid circuits for fire alarm systems it has been known to use a Bourdon tube which detects such loss of pressure and which releases a catch so as to provide an indication that a fire situation exists. The use of components such as Bourdon tubes has not in the past been found to be entirely satisfactory in providing a speedy, effective or reliable indication of loss of pressure in a circuit of a pressurized fluid fire alarm system.

It is thus an object of the present invention, in one aspect thereof, to provide pressurized fluid circuits for a pressurized fluid fire alarm system which overcome at least some of the disadvantages of previous circuits used therefor. It is a further object of the present invention, according to another aspect, to provide a pressure drop detector for a pressurized fluid fire alarm system, which detector overcoming at least some of the disadvantages of previous pressure drop detectors used in such systems.

Again, it is yet a further object of this invention to provide a pressurized fluid fire alarm system in which the speedy, efficient and reliable detection of a pressure drop therein is obtainable.

According to a first aspect of the present invention there is thus provided a pressurized fluid circuit comprising at least one channel provided in a surface of a thickness of material and a diaphragm mountable above said surface and moveable relative thereto to close off or open said at least one channel to a source of fluid pressure, at at least one valve seat portion provided on said surface.

According to a second aspect of this invention there is thus provided a pressure drop detector for a pressurized fluid fire alarm system including a pressurized fluid circuit as hereinabove defined in which at least one piston is mounted on said diaphragm to be moveable towards or away from a top plate secured to said diaphragm and said thickness of material, an aperture provided in said top plate in which said piston can move, an upper surface of said piston engaging an operating arm which controls a pressure drop indicator, whereby a drop in pressure in said system to a predetermined level results in said operating arm causing the operation of said indicator.

According to a third aspect of this invention there is thus provided a pressurized fluid fire alarm system comprising at least one detector as hereinabove defined, and further including a switching bar operated by said indicator, said switching bar in turn operating at least one fire alarm signalling means.

Further aspects of this invention, which should be considered in all its novel aspects, will become apparent from the following description, given by way of example of one embodiment of the invention and in which reference is made to the accompanying drawings, wherein:

FIG. 1: shows an exploded front elevational view of a pressure drop detector according to one embodiment of the invention.

Figure 2:
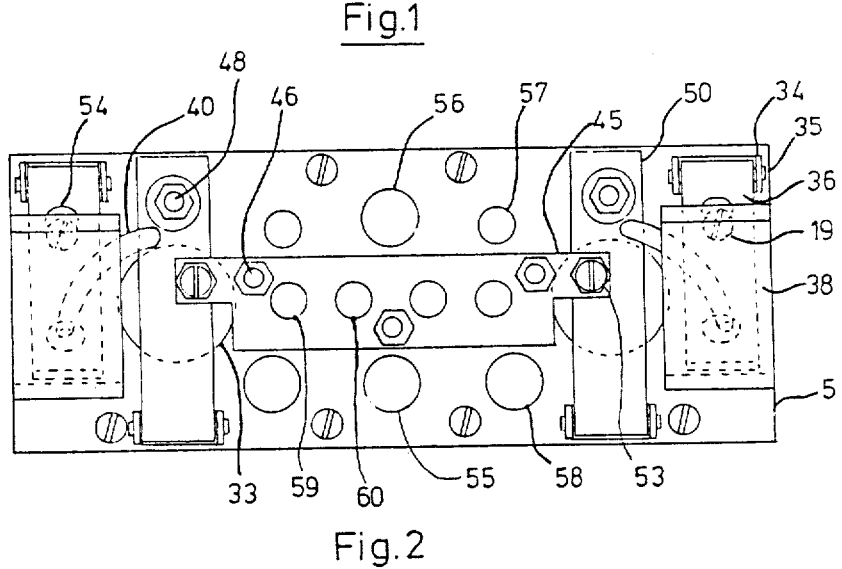

FIG. 2: shows a plan view of the pressure drop detector of FIG. 1 along arrow "A".

FIG. 3: shows a plan view of the pressurized fluid circuit of the pressure drop detector of FIG. 1 along arrow "B".

FIG. 4: shows a plan view of the bottom plate of the pressure drop detector of FIG. 1 along arrow "C".

FIG. 5: shows a perspective view of a valve lifting tool for use with the pressure drop detector of FIG. 1.

FIG. 6: shows a cross-sectional view along arrows VI—VI of FIG. 1.

Figure 7:
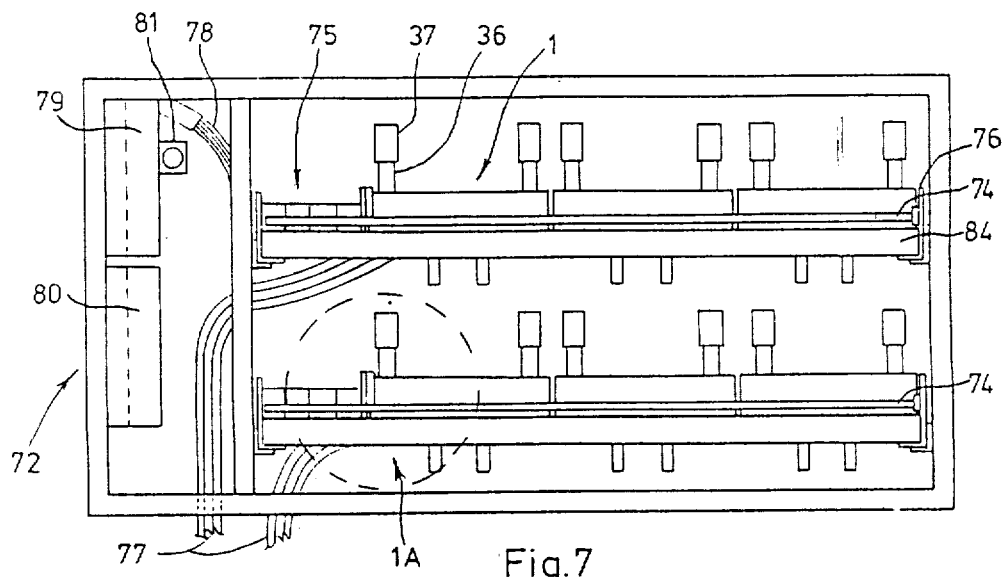

FIG. 7: shows a diagrammatic front view of a fire alarm cabinet for a pressurized fluid system, with its front cover removed.

Figure 7A:
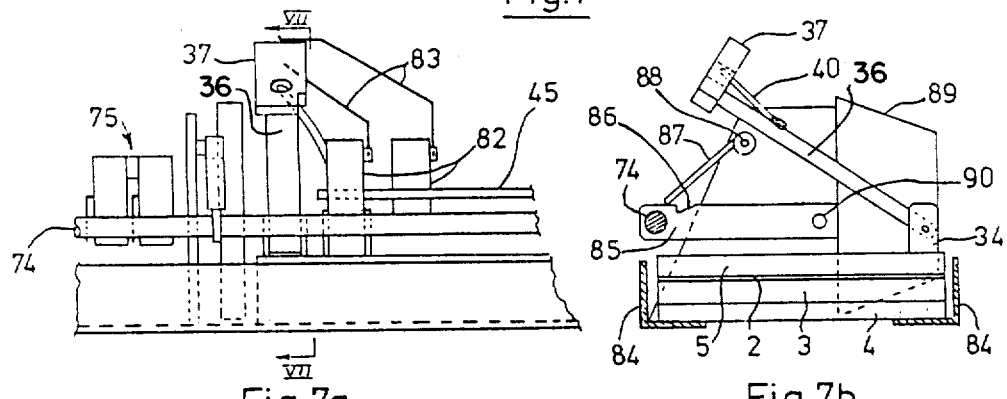

FIG. 7a: shows a more detailed view of the portion of FIG. 7 within the dotted circle.

Figure 7B:
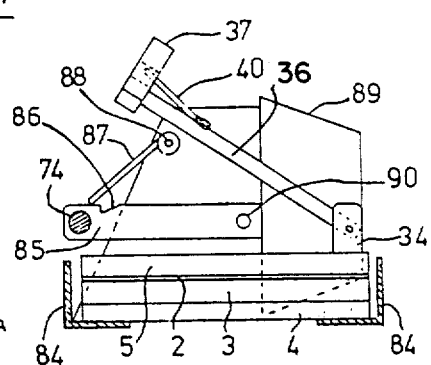

FIG. 7b: shows a view along arrows VII—VII of FIG. 7A.

Figure 8:
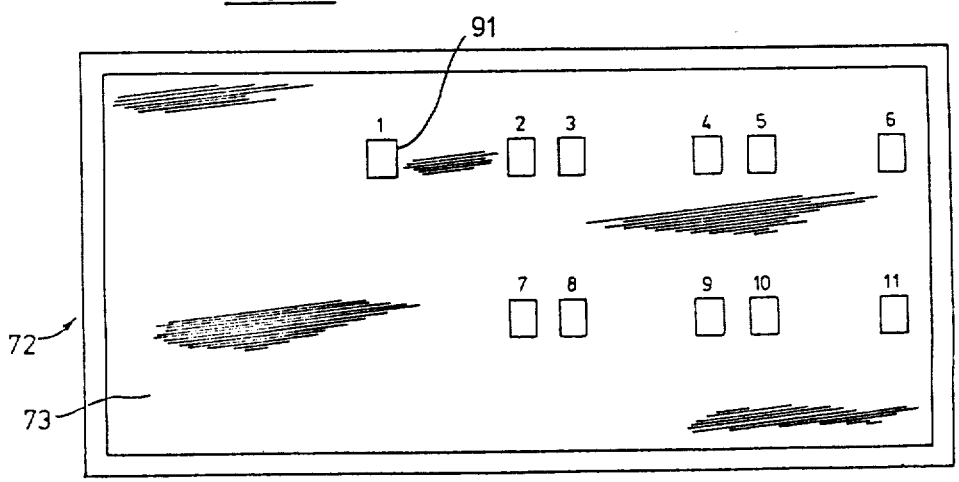

FIG. 8: shows a diagrammatic front view of the cabinet of FIG. 7 with its front cover in place.

Referring now to the accompanying drawings and more especially to FIGS. 1 to 4 thereof, a pressure drop detector, referenced generally by arrow 1, for a pressurized fluid fire alarm system, has a top plate 5, a diaphragm 2, a pressurized fluid circuit block 3 and a bottom plate 4. The detector components 2 to 5 are secured together by means of bolts or screws passing through holes 19 provided through the plate 5, diaphragm 2 and the pressurized fluid circuit block 3, which are engaged within tapped holes 21 provided through the bottom plate 4.

Additional holes such as countersunk holes 20 provided in the circuit block 3 can enable further bolts or screws to directly secure the block 3 to bottom plate 4 by means of additional tapped holes provided therein, such as shown diagrammatically at 22.

The pressurized fluid circuit for the detector 1 is provided on an upper surface of the block 3 of suitable material and includes a plurality of channels formed or provided therein. The channels may be formed or provided on the surface of the block 3 by any suitable technique such as, for example, by milling, gouging, etching or the like. Alternatively, the grooves or channels may be formed by a suitable casting or moulding technique if such is applicable to the material used for the circuit block 3. In one embodiment of the present invention the material used for block 3 is polyvinyl chloride and, as shown in the accompanying drawings, the use of such a material for the block 3 requires a bottom plate 4 of suitably strong material, such as a suitable metal. This strengthens the assembled detector and allows the tapped holes 21 to be provided in the rigid bottom plate 4, with the block 3 and diaphragm 2 being sandwiched between the bottom and top plates 4 and 5 respectively. It is to be appreciated that if the material used for the block 3 is itself of a stronger material than polyvinyl chloride then the bottom plate 4 could be omitted and the tapped holes provided instead in the block 3.

In the particular form of detector shown in the accompanying drawings the pressurized fluid circuit provided on the surface of the block 3, as shown in FIG. 3 especially, is duplicated about a substantially central part thereof. This duplication enables the detector to detect a drop in pressure in two separate pressurized fluid lines. It is to be appreciated that the pressurized fluid circuit of the block 3 shown in FIG. 3 is that which has been developed specifically for the detector 1. The present invention however in its broadest aspect relates to the provision of any required pressurized fluid circuit on the surface of a material, which circuit taking the form of at least one channel formed or provided on said surface.

In FIG. 3 a pressurized fluid inlet 9 and a pressurized fluid outlet 8 comprise holes extending from an upper to a lower surface of the block 3. The inlet and outlet are provided on either side of, and substantially in line with, a channel 7 with respective portions "O" and "I" defining areas against which a valve may seat in isolating the fluid circuitry from the inlet or outlet respectively. A further channel extends outwardly from the channel 7 to a further valve seat portion "T" and thence by a further channel to a pressure release or test outlet 14. Yet a further channel, from adjacent the valve seat portion "T", extends to a return circuit inlet 10 and thence to a return circuit cutoff valve seat portion R and finally through another channel 15 to a piston seat portion, referenced generally by arrow 16, and in which portion there is provided a circuit outlet 11. Pressurized fluid lines would connect, in use, the outlet 11 with the circuit return 10 to define one pressurized fluid circuit line within which a plurality of temperature detectors for example such as described in my U.S. patent application Ser. No. 896,407 of Apr. 14, 1978, could be connected. A further channel 18 is connected at one end with the pressure supply channel 7 and at the other end, via a restricted feed valve seat portion "X", to one or more threads of fluid permeable material 17 with ends thereof inserted in respective holes 12 and 13. As will be seen from FIG. 3 the thread(s) 17 extend to the piston seat portion 16. It has been found that by the use of one or more threads 17 a restricted pressure feed to the pressure circuit line, via the piston seat portion 16 can be provided so as to compensate for any slight pressure drops which may occur in the system. The amount of this restricted pressure feed will of course depend on the thread material and also on the size thereof. The thread (s)17 may suitably be of cotton and may comprise a strip of threaded cloth material. If a freeing agent, such as silicon grease, is used between the diaphragm 2 and the block 3 then the thread(s) 17 may require a protecting cover and may for this purpose have cellophane for example wrapped therearound.

The pressurized fluid circuit hereinbefore described is duplicated on the other side of the block 3, these two duplicated circuits being referenced generally by arrows 6.

In the application of the present invention in its broadest aspect to a pressure control valve, the use of a pressurized fluid circuit having channels such as of FIG. 3 and a diaphragm such as of FIG. 1, would obviate the inherent disadvantage of possible leakage which may occur in prior art valves using sliding valve surfaces Reference to FIGS. 1 and 2, in conjunction with FIG. 3 shows that valve heads 41 and 42 are normally spring biased by means of respective springs 44 to press the diaphragm 2 against the pressure test/release outlet 14 and the valve seat portion "T" respectively. Thus, the pressurized fluid line, including the aforementioned temperature detectors connected between the line outlet 11 and the line return 10 is normally isolated, with the exception of the restricted feed flow through the thread(s) 17, from the pressurized fluid inlet 9 and outlet 8 and channel 7. Although the diaphragm 2 does not normally cut-off the pressurized fluid supply across the valve seat portions "O", "I" and "X", provision is made in the top plate 5 by means of valve seat apertures 56, 55 and 57 respectively for such cut-off to take place by the use of a suitable tool. Such a tool is shown in FIG. 5 of the accompanying drawings and is described hereinafter.

The provision of further valve seat apertures 58 enables the diaphragm 2 to be seated against the respective valve seat portions "R" so as to cut off the channel 15 and the piston seat portion 16 from the line return inlet 10.

When it is required to pressurize the pressurized fluid line, including the temperature detectors, the valve seat 42 can be lifted manually, for example by means of a screwdriver, such that pressurized fluid can then flow from the channel 7 across the valve seat portion "T" and into the pressure line through the line return inlet 10 and also through channel 15 to the piston seating area 16. Such pressurization of the line will cause the diaphragm 2 to lift the piston 33, the upstanding projection 62 of which will cause the subsequent lifting of an operating arm 50, as will hereinafter be described in more detail.

As will be seen from reference to FIGS. 1 and 3 of the accompanying drawings, pressure release/test outlet 14 has connected thereto a nozzle 30 including an "O" ring seal 31. Tubing connected with detector testing equipment can be slid over the "O" ring 31 of the nozzle and, with the valve seat 41 lifted, the operational characteristics of the temperature detectors in that particular pressurized line circuit can be checked. It will also be seen that pipes 28, 29 and 32 are respectively connected to the pressure outlet 8, the circuit return inlet 10 and the pressure line outlet 11 in the piston seating area 16. A further pipe (not shown) is of course connected to the pressure inlet 9.

In use, a first pressure drop detector 1 would have its pressure inlet 9 connected to a suitable pressure tank through a pipe whilst a similar pipe 28 connected to its pressure outlet 8 would then be connected to the pressure inlet 9 of the next detector and so on through all the pressure drop detectors of the pressurized fluid fire alarm system. These detectors, as will hereinafter be described in more detail, may be suitably mounted together in a fire alarm board 72 (see FIGS. 7 and 8).

The pipes 28, 29 and 32, the inlet pipe (not shown) and the test nozzles 30 extend from the circuit block 3 through respective apertures 23, 27, 25, 24 and 26 in bottom plate 4.

It is envisaged that a suitable tank pressure for the plurality of pressurized fluid line circuits, two line circuits per detector 1, may be up to forty pounds per square inch (275.6 kPa) and may, for example, be of the order of twenty pounds per square inch (137.8 kPa). In each pressurized fluid line circuit a plurality of heat sensitive detectors, incorporating a fusible plug, suitable detectors being described in my aforementioned U.S. patent application would be connected in series one with the other, each detector being suitably located in the area to be protected. Thus, in the event of a fire in the area protected, one or more of the detectors would detect the raise in temperature and upon melting of the aforementioned fusible plug, the pressurized fluid in the pressurized fluid line would escape thus causing a pressure drop in the line. This pressure drop will then be detected by one of the pressure drop detectors 1.

If the normal pressure, i.e. that of the tank, is twenty pounds per square inch then the "fire" release pressure may be of the order of 15.5 to 16 pounds per square inch. With a pressure drop of this order one of the detectors 1 would give an immediate indication as to the pressure line in which the pressure drop has occurred, as hereinafter described. However, in that slow leaks of pressurized fluid from the circuit lines may occur, (which slow loss of pressurized fluid and thus of pressure being large enough not to be compensated by the restricted feed through the channel 18 and thread 17 of the circuit block 3), provision may also be provided to provide an indication that such slow loss is occurring whilst not indicating the more serious "fire" condition.

Thus, in a preferred fire alarm system one pressure drop detector will be connected, not to temperature detectors of the type hereinbefore mentioned, but to the main pressure line such that any drop in the main tank pressure and thus the pressure to the various pressure drop detectors, can be detected. Such pressure drop detector may be adjusted so as to operate at a "defect" release pressure of, in the example hereinabove given, 17 to 17.5 pounds per square inch. This indication of a "defect" would result in an immediate signal being given to the fire brigade along, in the case of regulations pertaining to New Zealand, two Post Office lines.

However, in the event of a "fire" condition the appropriate pressure drop detector(s) would provide a visual indication at the premises of the area in which the fire has been detected and also a "fire" condition signal on each of the aforementioned Post Office lines.

Further there would normally be a provision for the ringing of internal and external bells together with any ancillary alarm signals which may be required in a particular situation.

With a pressurized fluid line, including the aforementioned temperature detectors, pressurized and connected to the line inlet and outlet 11 and 10 of the circuit block 3 through pipes 32 and 29 respectively, the piston 33 will be raised by the diaphragm 2 from the piston seating area 16 and its projection 62 will abut the under surface of the arm 50 extending across the upper surface of the top plate 5. The arm 50 is pivoted to bracket 51 by means of a pin 52.

Referring particularly to FIG. 6 of the accompanying drawings it will be seen that the raising of arm 50 by the piston 33 is against the bias of a spring 49, the bottom end of which seats in a recess 61 formed in the arm 50. The bias of the spring 49 is adjustable by means of a nut 47 on a threaded portion of a stud 48. The upward movement of arm 50 is restricted by means of a screw 53 extending downwardly from a valve mounting plate 45. Connected with the arm 50 is an upwardly directed catch 40, the free end of which engages, as shown, in an aperture 39 provided in a hammer 37. The hammer 37 may have a cover 38 on the front face thereof, which cover suitably being of, for example a red adhesive tape. The hammer 37 is provided at the upper end of an arm 36 which is pivoted on pin 35 to a bracket 34 secured to the top plate 5. The arm 36 has an aperture 54 which enables one of the screws holding the assembled pressure drop detector together to be engaged with a screwdriver.

With particular reference to FIGS. 1 and 2 of the accompanying drawings it will be seen that, with the parts of the pressure drop detector 1 secured together, the pressure test/release and flood valves 59 and 60 respectively of each of the two pressurized fluid circuits 6 of the circuit block 3 of detector 1 will have their respective valve seats 41 and 42 biassed by means of springs 44 against the diaphragm 2 so as to close off the pressure test outlet 14 and the valve seat portion "T" respectively.

Each of the valve stems of the valves 59 and 60 includes a flange portion 43 which acts as a stop for the downward movement of the valve seats 41 and 42. The upper ends of the valve stems are accommodated within apertures provided in the plate 45 which is secured above the top plate 5 by means of nut and bolt arrangements 46. The springs 44 are compressed between the bottom surface of the plate 45 and the upper surface of the valve stem flanges 43. As has previously been mentioned the flood valves 60 and the test valves 59 can be manually opened as and when required by the manual lifting of the valves, for example by the insertion of a screwdriver beneath the flanges 43 and by upward movement with a lever type action.

Particular reference to FIG. 2 of the accompanying drawings will show the diaphragm 2 exposed beneath the apertures 55 to 58 in the top plate 5. This exposure of the diaphragm 2 enables the normally-open parts of the pressurized fluid circuits 6 of circuit block 3 to be closed off as and when required. Thus the main fluid pressure inlet and outlet, 9 and 8 of circuit block 3 can be closed off through apertures 56 and 55 respectively. Similarly, the restricted feed from channel 18 through thread 17 to the piston seat area 16 of the circuit block 3 can be closed off through the aperture 57 provided for each of the circuits 6. Again, the pressure line circuit return to inlet 10 in circuit block 3 can be closed off through the aperture 58 provided for each of the circuits 6, the diaphragm 2 in this case then being caused to be pressed against the valve seat portions "R" shown in the circuits 6 of FIG. 3. This closing off through the apertures 55 and 58 may be effected by any suitable tool, one example of which is shown in FIG. 5 of the accompanying drawings.

This tool will be seen to comprise a threaded stud 65 having at a bottom end thereof a valve seat assembly 69 including a valve seat 70, the latter possibly being of a suitable resilient material for example rubber. A spring 68 is compressed between the valve seat assembly 69 and a flange 67 provided at a bottom end of a bush 64 slid onto the stud 65. The flange 67 includes a paid of spaced apart projections 71. Threaded onto the stud 65 is a circular disc 66.

If it is required to close off, for example, the return circuit feed to one of the circuits 6, then the valve seat assembly 69 including the valve seat 70 would be inserted into the appropriate aperture 58 with the threaded disc 66 screwed down onto the stud 65 sufficiently so that the projections 71 are moved towards the valve seat assembly 69 against the bias of spring 68. This downward movement of the projections 71 allows them to engage beneath the valve mounting plate 45. Upon the anti-clockwise movement of the disc 66 and with the projections 71 still engaged beneath the valve mounting bar 45, the valve seat 70 will be firmly pressed against the diaphragm 2 through the aperture 58. This then closes off, in this case, the return circuit path across valve seat portion "R" of one of the pressurized circuits 6 of circuit block 3.

Corresponding operations with tools of the type such as shown in FIG. 5 can be effected in blocking off through the apertures 55 to 58 one or more of the normally open parts of the circuits 6 of the pressure drop detector 1.

Referring again to FIG. 6 of the accompanying drawings it will be appreciated that a loss of pressure within a pressurized fluid line will be reflected in a lowering of a piston 33 and thus the corresponding lowering of the operating arm 50. If a sufficient pressure drop has occured, for example in the event of a fire and the fusible plug of one or more of the temperature detectors having melted, then the arm 50 will have moved downwardly sufficient for the catch 40 to become disengaged from the aperture 39 in the hammer 37. The hammer 37 will then drop under its own weight for the purpose hereinafter mentioned.

The lowered pressure at which the hammer 37 will drop is of course a critical factor in the operation of the detector 1 and is thus pre-set to a pre-determined value, which value may be that which is subject to local or Government regulation.

This presetting of the pressure at which the hammer 37 will be released can be effected by connecting a module tester with the test nozzle 30. The module tester may comprise a pressure gauge which is connected directly into a pressure tank, of a suitable capacity, for example 50 cc, and which has three non-return valve outlets. One of these valve outlets has a flexible hose fitted which is terminated at its free end with a "push-on" fitting machined so as to mate with the nozzle 30. The second non-return valve is not normally used, this being incorporated only to allow connection of a pump should this be required. The third non-return valve normally has the internal valve removed, the air seal being maintained by a cap alone. This cap can be used to slowly leak air out of the system for the purpose of this pre-setting. The flexible hose of the module tester can therefore be slid onto the nozzle 30 of the circuit to be tested and over the "O" ring when the flooding valve and release valves of that circuit 60 and 59 are then both held open so as to apply tank pressure to both the circuit 6 and pressure lines and detectors connected thereto, and also the module tester and further to fill the tank of the module tester. The flooding valve 60 is then closed and with the release valve 59 open the valve cap of the non-return valve of the module tester is slowly opened so as to slowly bleed air out of the module tester and the circuit 6. The pressure gauge will of course indicate the lowered pressure at which the hammer 37 is released. The adjustment nut 47 can then be screwed down to increase "release" pressure or up to decrease "release" pressure as required.

Similarly, with a tool such as that shown in FIG. 5 of the accompanying drawings operated so as to block off the return circuit of one of the circuits 6 through an appropriate aperture release valve 60 will now release the pressurized fluid from that pressure circuit and pressure lines and detectors connected thereto, with the fluid flowing completely round the circuit; this technique being used to prove that the pressure line connected to the circuit 6 is not blocked.

Also, to test whether a circuit is leaking this can be effected by closing off the restricted feed by use of a tool such as that of FIG. 5 inserted within an appropriate aperture 57 in the top plate 5, the hammer 37 releasing if the circuit is in fact leaking.

In locating an air leak in a pressureline, which, it will be appreciated, can extend over a quite considerable area, it is to be noted that, as hereinbefore mentioned, the main pressure tank supply is reticulated to all pressure drop detectors through their inlet and outlet ports 9 and 8, the ports of all the detectors being connected in series one with the other. By closing off the inlet and outlet of the detectors in turn, the detectors can be sequentially isolated so as to enable the location of the leak to be pin-pointed. The pressure line in which the leak is occurring will be quickly indicated when its pressure drop detector is isolated from the main pressure supply, this indication being given either by the dropping of the hammer and/or by the connection of the aforementioned module tester to the test nozzle 30 and the operation of the release value 59.

As will be apparent from the above description each of the pressure drop detectors shown in the accompanying drawings incorporates two identical pressurized fluid circuits 6 on circuit block 3 in exemplifying the present invention in its broadest aspect. Thus, a pressure drop in either one of the circuits will be indicated by the falling of an appropriate hammer 37 once the required pressure drop has been reached.

If the area to be protected is large, for example a multi-storied building, separate pressure lines including a plurality of temperature detectors, will be provided for distinct portions of that area, for example one pressure line and detectors may be provided for each floor of the building. Thus, if a pressure drop occurs in that line then the hammer associated with that circuit will drop and provide an immediate indication to the fire brigade upon arrival at the scene of the fire as to the exact location of that fire.

Accordingly, in FIGS. 7, 7a, 7b and 8 of the accompanying drawings a plurality of pressure drop detectors 1 are shown mounted within a cabinet 72 having a front panel 73 with an appropriate number of windows, numbered 1 to 11, provided therein. In the particular example shown six pressure drop detectors 1 are mounted on two vertically spaced apart shelves 84 held within the cabinet 2 by brackets 76. At one end of the shelves 84 are provided a plurality of micro-switches 75. As is shown more clearly in FIG. 7a these micro-switches 75 have wands which are moved downwardly by a switching bar 74 if the switching bar 74 is impacted upon the release of any one of the hammers 37 of its associated pressure drop detectors 1. Operation of two of the micro-switches 75 will cause a fire alarm signal to be sent to the fire brigade by modulator 80 along the two Post Office lines connected thereto whilst the other two micro-switches 75 will cause an inner and outer brigade alarm bell to ring.

An isolating electrical network 79 enables the fire alarm circuitry to be disconnected and a chassis switch 81 ensures that upon closing of the cabinet the front panel 73 engages thereagainst so as to reconnect the fire alarm circuitry.

In the particular pressure monitoring system shown in FIGS. 7, 7a, 7b and 8 of the accompanying drawings one of the pressure drop detectors 1 includes a monitoring function which provides an indication if the main pressure supply to the system is getting dangerously low thus indicating that there is a leak somewhere in the system between the pressure tank and its connections with the pressure drop detectors 1. If the main pressure should decrease to a pre-set level then the left hand hammer 37 of pressure drop detector 1A, shown within dotted lines in FIG. 7, will drop, this in turn allowing the downward movement of two wands 83 of two micro-switches 82 mounted on either side of the valve mounting bar 45. It is necessary that the hammer 37 should not, in falling, operate the switching bar 74 and thus a suitable stop (not shown) is provided against which the hammer 37 will hit before it reaches the switching bar 74 or alternatively the length of the arm connected to the hammer 37 can be shortened such that the hammer 37 does not reach as far as the switching bar 74 at its lowest point. Operation of the two micro-switches 82 will cause a "defect" signal to be communicated along the two aforementioned Post Office lines to the fire brigade. The fire brigade will thus be in a position to advise that the system requires attention in locating the leak which has caused the "defect" alarm to be given as otherwise a continuance of this leak could possibly cause a sufficiently large drop in pressure to cause one or more of the other pressure drop detectors 1 to operate, thus giving false "fire" signal condition indications.

As has previously been mentioned the main pressure tank may be at a pressure of twenty pounds per square inch and in this case the "defect" condition giving rise to operation of the microswitches 82 could be in the region of 17 to 17.5 pounds per square inch whilst the "fire" release pressure would not be realized until 15.5 to 16 pounds per square inch was reached.

Turning now to FIG. 7b of the accompanying drawings the switching bar 74 is shown provided with an arm 85 pivotally connected at 90 and is provided with a counter weight 89 such that the bar 74 is normally biased towards its raised position as shown in FIG. 7b. However, upon the bar 74 being hit by a hammer 37 the bar 74 will drop, upon which a pawl 87 pivoted at 88 will engage within a slot 86 provided in the arm 85 thus preventing the return of the switching bar 74 to its raised position and thus maintaining the micro-switches 75 in their operated condition. Thus, the "fire" condition signals will be continued to be transmitted to the fire brigade and the internal and external bells will continue to ring.

Also in FIG. 7b the cross section through one pressure drop detector 1 shows the top plate 5, diaphragm 2, circuit block 3 and lower 4 secured together and mounted on the shelves 84 extending across the cabinet 72.

With particular reference to FIG. 8 of the accompanying drawings it will be appreciated that upon a "fire" condition signal being given to the fire brigade and upon their arrival at the premises protected they will be able to quickly see with inspection of the windows 91, which part of the detected area has been affected by fire, the respective hammer being visible through its window. In that the dropping of the left hand hammer 37 of the pressure drop detector 1A does not signify a "fire" condition a window has not been shown provided therefor.

A lock (not shown) would be provided such that only authorized personnel would be able to open the cabinet 72 thus substantially preventing malicious interference with the pressure drop detectors or circuitry associated therewith.

Returning now to FIG. 7 of the accompanying drawings the fluid pressure pipes 77 connected to the respective detectors 1 are shown leaving the cabinet 72 through apertures provided therefor whilst electrical wiring 78 interconnects the circuitry of the modulator 80 and the isolator 79 with the microswitches 75 and 82.

If additional alarms are to be given upon operation of one or more of the hammers of the detectors 1 then microswitches such as 82 can be readily mounted so as to be operated by the downward movement of the required hammer and so as to provide the necessary electrical signal and thus the desired audible and/or visual or other alarm signal.

As has been previously mentioned the circuits 6 may be provided on a block 3 of polyvinyl chloride; if such material is used for this purpose, then the pipes such as referenced 28, 29 and 32 in FIG. 1 and generally by 77 in FIG. 7, may also be of polyvinyl chloride and the pipes may be bounded within the apertures provided about the bottom surface of the block 3 by use of an adhesive or alternatively by the use of a solvent such as methyl ethyl ketone. Also, so as to enhance the fluid tight engagement of said pipes with said block 3 the holes provided in the block 3 for the pipes may be inwardly tapered so as to ensure a jam tight fit prior to bonding being effected. For a further description of the bonding of polyvinyl chloride pipes to ducts provided in polyvinyl chloride material reference should be made to my aforementioned U.S. Patent Application.

The present invention therefore in its broadest aspect provides a pressurized fluid circuit of which a particular embodiment for a particular purpose is shown in FIG. 3 of the accompanying drawings in which a pressurized fluid circuit block is incorporated into a pressure drop detector for a pressurized fluid fire alarm system.

The present invention according to further aspects thereof also provides a pressurized fluid fire alarm system and pressure drop detector therefor which provide for the speedy and efficient monitoring of pressure drop in such a system such that a required alarm signal can be given.

Although this invention has been described by way of example and with reference to preferred embodiments of the invention it is to be understood that modifications and improvements may be made thereto without departing from the scope of the present invention as defined by the appended claims.

I claim:

1. A pressure drop detector for a pressurized fluid fire alarm system, said detector comprising a block of material having in a first surface thereof a pressurized fluid circuit in the form of grooves or channels forming fluid flow paths in said first surface, apertures provided in a second surface of said block for connecting said fluid with tubes or pipes of the pressurized fluid fire alarm system, a flat diaphragm connected to said block over said first surface but movable relative thereto to (a) detect the pressure in said system at an appropriate portion of said fluid circuit and to operate a low system pressure indicating means when the system pressure has dropped to a predetermined level and (b) to control fluid flow along said fluid flow paths in said fluid circuit at at least one valve seat portion provided on said first surface.

2. A pressure drop detector as claimed in claim 1, wherein a top plate secures said diaphragm to said first surface and an aperture provided in said plate above the or each valve seat portion exposes said diaphragm and enables a valve seat to extend therethrough and move said diaphragm against said valve seat portion.

3. A pressure drop detector as claimed in claim 2, in which said low system pressure indicating means comprises at least one piston mounted on said diaphragm to be movable therewith, a further aperture provided in said top plate in which said piston can move, and an upper surface of said piston which engages an operating arm to control a pressure drop indicator, whereby a drop in pressure in said system to said predetermined level results in said operating arm causing the operation of said indicator.

4. A pressure drop detector as claimed in claim 3, wherein said indicator comprises a hammer which is held by a catch engaging in an aperture in said hammer, said catch connected to and movable with said operating arm to release said hammer.

5. A pressure drop detector as claimed in claim 4, wherein said operating arm is adjustably biased towards said piston such that the pressure at which said hammer is released can be preset.

6. A pressure drop detector as claimed in claim 5, wherein said hammer is mounted at a free end of a mounting arm, an opposite end of said mounting arm being pivotally connected with said top plate.

7. A pressure drop detector as claimed in claim 1, wherein one or more fluid permeable threads having opposite ends thereof located in respective holes provided in said first surface are included in said pressurized fluid circuit to provide a restricted fluid flow therealong between the parts of the pressurized fluid circuit are connected thereby.

8. A pressure drop detector as claimed in claim 1, in which a central groove or channel in said first surface is provided to connect a pressurized fluid source with a pair of said pressurized fluid circuits provided, one on either side of said central groove or channel, for connection with respective parts of said pressurized fluid fire alarm system to detect system pressure drop occuring therein.

* * * * *